(12) United States Patent
Liu et al.

(10) Patent No.: US 10,690,373 B2
(45) Date of Patent: Jun. 23, 2020

(54) TOTAL HEAT EXCHANGE DEVICE AND CONTROLLING METHOD OF THE SAME

(71) Applicants: Panasonic Ecology Systems Guangdong Co., Ltd., Foshan, Guangdong (CN); Panasonic Corporation, Osaka (JP)

(72) Inventors: Kai Liu, Guangdong (CN); Houfu Lin, Guangdong (CN); Simei Huang, Guangdong (CN); Daisuke Hashino, Aichi (JP); Taketo Yamamoto, Aichi (JP); Kouji Iio, Aichi (JP)

(73) Assignees: Panasonic Ecology Systems Guangdong Co., Ltd., Foshan, Guangdong (KR); Panasonic Corporation, Osaka (JP)

(*) Notice: Subject to any disclaimer, the term of this patent is extended or adjusted under 35 U.S.C. 154(b) by 12 days.

(21) Appl. No.: 15/465,780

(22) Filed: Mar. 22, 2017

(65) Prior Publication Data
US 2017/0276393 A1 Sep. 28, 2017

(30) Foreign Application Priority Data
Mar. 23, 2016 (CN) .......................... 2016 1 0171023

(51) Int. Cl.
*F24F 11/30* (2018.01)
*F24F 11/41* (2018.01)
(Continued)

(52) U.S. Cl.
CPC ............ *F24F 12/006* (2013.01); *F24F 11/30* (2018.01); *F24F 11/62* (2018.01); *F24F 11/83* (2018.01);
(Continued)

(58) Field of Classification Search
CPC .......... F24F 12/006; F24F 13/22; F24F 11/62; F24F 11/30; F24F 11/83; F24F 11/84;
(Continued)

(56) References Cited

U.S. PATENT DOCUMENTS 5,193,610 A * 3/1993 Morissette ............ F24F 12/006
165/54
5,632,334 A * 5/1997 Grinbergs ............. F24F 12/006
165/232

(Continued)

FOREIGN PATENT DOCUMENTS

CN 102563825 A 7/2012
CN 104136857 A 11/2014
EP 2650617 A1 * 10/2013 ............ F24F 12/006

*Primary Examiner* — Edward F Landrum
*Assistant Examiner* — Chang H Park
(74) *Attorney, Agent, or Firm* — RatnerPrestia (57) ABSTRACT

A total heat exchange device includes: a fan for the exhaust air path which directs air from an indoor exhaust port to an outdoor discharge port through an exhaust air path; another fan for intake air path which directs air from an outdoor suction port to an indoor intake port through an intake air path; and a heat exchange element for exchanging heat between air passing through the exhaust air path and air passing through the intake air path. Also included is a temperature detector for detecting an outdoor temperature and a controller configured to perform a heat exchange mode in which heat is exchanged between air passing through the exhaust air path and air passing through the intake air path or a defrosting mode in which frost on the heat exchange element is thawed, in accordance with the outdoor temperature detected by the temperature detector.

7 Claims, 7 Drawing Sheets

(51) Int. Cl.
*F24F 11/61* (2018.01)
*F24F 11/62* (2018.01)
*F24F 11/63* (2018.01)
*F24F 11/65* (2018.01)
*F24F 11/83* (2018.01)
*F24F 11/84* (2018.01)
*F24F 110/12* (2018.01)
*F24F 12/00* (2006.01)
*F24F 13/22* (2006.01)

(52) U.S. Cl.
CPC ............... *F24F 13/22* (2013.01); *F24F 11/41* (2018.01); *F24F 11/61* (2018.01); *F24F 11/63* (2018.01); *F24F 11/65* (2018.01); *F24F 11/84* (2018.01); *F24F 2013/221* (2013.01); *F24F 2110/12* (2018.01); *Y02B 30/563* (2013.01)

(58) Field of Classification Search
CPC .. F24F 11/63; F24F 11/41; F24F 11/65; F24F 11/61; F24F 2110/12; F24F 2013/221; Y02B 30/563; F25B 2347/00; F25B 2347/02; F25B 2347/021; F25B 2347/022; F25B 2347/023; F25B 2700/11
See application file for complete search history.

(56) References Cited

U.S. PATENT DOCUMENTS

| | | | | |
|---|---|---|---|---|
| 6,176,305 | B1* | 1/2001 | Haglid | F24F 5/0035 165/231 |
| 7,013,950 | B2* | 3/2006 | Steneby | F24F 12/006 165/11.1 |
| 9,803,884 | B2* | 10/2017 | Jung | F24F 12/006 |
| 2004/0177627 | A1* | 9/2004 | Fujimoto | F24F 12/006 62/151 |
| 2011/0189937 | A1* | 8/2011 | Hasegawa | F24F 12/006 454/239 |

* cited by examiner

TOTAL HEAT EXCHANGE DEVICE AND CONTROLLING METHOD OF THE SAME

CROSS-REFERENCE TO RELATED APPLICATION

This application claims the benefit of Chinese Patent Application No. 201610171023.8 filed on Mar. 23, 2016 in the State Intellectual Property Office of China, the whole disclosure of which is incorporated herein by reference.

TECHNICAL FIELD

The present disclosure relates to a total heat exchange system, and especially, to a total heat exchange device capable of defrosting as well as to a controlling method of the same.

BACKGROUND

Figure 7A:
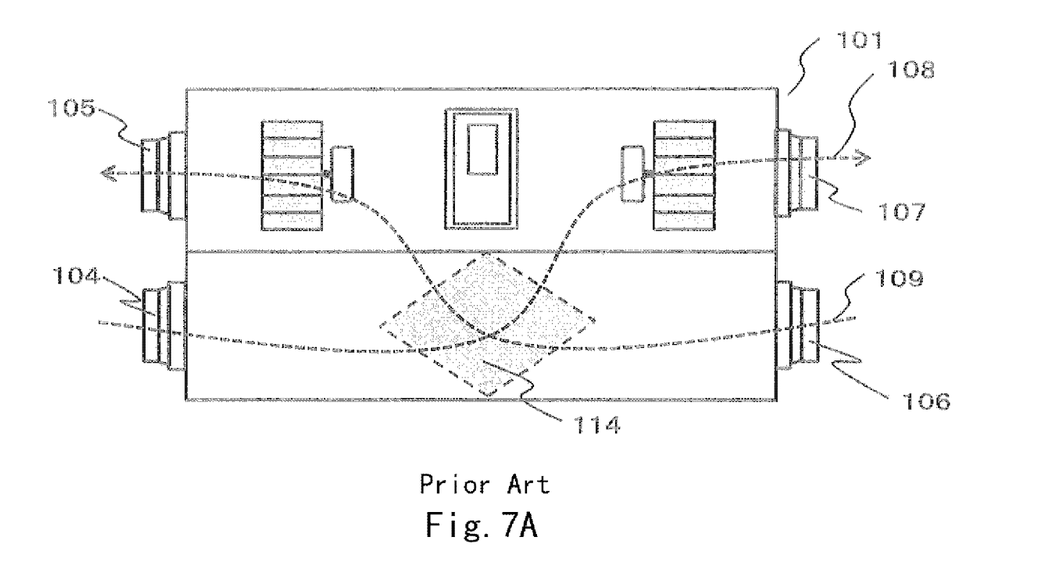
FIG. 7A is a schematic view of the air path in the heat exchange operation in the prior art.
Figure 7B:
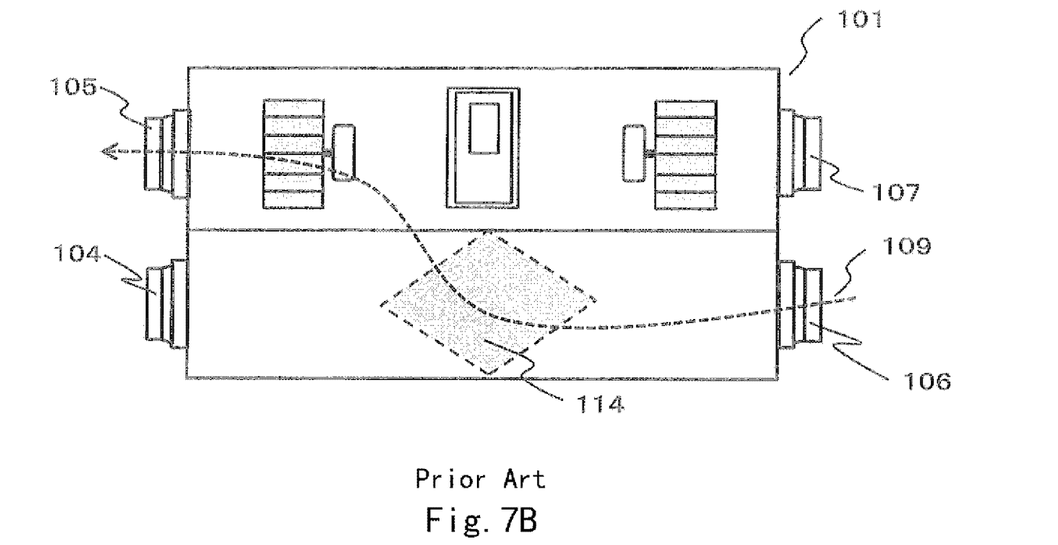
FIG. 7B is a schematic view of the air path in the exhaust operation in the prior art.

FIG. 7A is a schematic view of air paths of a heat exchange operation in the prior art;

FIG. 7B is a schematic view of air paths of an air exhaust operation in the prior art.

Now, the prior art is described with reference to FIGS. 7A and 7B. A conventional total heat exchange device 101 performs a heat exchange operation and an air exhaust operation. In the heat exchange operation, air is directed from an indoor exhaust port 106 to an outdoor discharge port 105 through an exhaust air path 109 and the air is directed from an outdoor suction port 104 to an indoor intake port 107 through an intake air path 108, and at the same time, heat exchange is performed between the air passing along the exhaust air path and the air passing along the intake air path. In the air exhaust operation, air sucked from the indoor exhaust port 106 is discharged from the outdoor discharge port 105 through a heat exchange element 114.

The above-described conventional total heat exchange device performs merely the heat exchange operation and the air exhaust operation. In case that an outdoor temperature in winter is very low (below zero), the total heat exchange device will be operated with an air exhaust operation of a low flow rate, to prevent the heat exchange element from being frozen. If the total heat exchange device is operated with an air exhaust operation of a low flow rate for a long time, it is possible that the amount of indoor ventilation is inadequate, such that indoor air quality is deteriorated, which makes the user feel uncomfortable.

SUMMARY

Accordingly, it is an object of the present disclosure to provide a total heat exchange device which can prevent the heat exchange element from being frozen while ensuring the indoor ventilation.

To achieve above mentioned objection, according to an aspect of the present disclosure, there is provided A total heat exchange device, comprising: a fan which directs air from an indoor exhaust port to an outdoor discharge port through an exhaust air path; a fan which directs air from an outdoor suction port to an indoor intake port through an intake air path; and a heat exchange element configured for exchanging heat between the air passing through the exhaust air path and the air passing through the intake air path, wherein the total heat exchange device further comprises: a temperature detector for detecting an outdoor temperature, and a controller which is configured to perform a heat exchange mode in which heat is exchanged between the air passing through the exhaust air path and the air passing through the intake air path or a defrosting mode in which frost on the heat exchange element is thawed, in accordance with the outdoor temperature detected by the temperature detector.

Optionally, the defrosting mode comprises a strong defrosting mode in which an internal circulation operation and a heat exchange operation are performed, and wherein in the internal circulation operation, the air sucked from the indoor exhaust port is discharged out of the heat exchange element through the exhaust air path in the heat exchange element, and then the air is further discharged from the indoor intake port after being discharged from the heat exchanger element through the intake air path in the heat exchange element; and in the heat exchange operation, the air is directed from the indoor exhaust port through the exhaust air path to the outdoor discharge port, while the air is directed from the outdoor suction port through the intake air path to the indoor intake port, and the heat exchange is performed between the air passing through the exhaust air path and the air passing through the intake air path.

Optionally, the defrosting mode further comprises a freeze prevention mode in which a stop operation and a heat exchange operation are performed, and wherein in the stop operation, air suction from the indoor exhaust port and the outdoor suction port is stopped, and air discharging from the indoor intake port and the outdoor discharge port is stopped.

Optionally, the heat exchange mode comprises the heat exchange operation.

Optionally, in the internal circulation operation, the controller is configured to close the outdoor suction port, close the outdoor discharge port, switch a damper having an open state in which the intake air path and the exhaust air path are communicated with each other and a closed state in which the intake air path and the exhaust air path are isolated from each other into the open state, open the indoor intake port, open the indoor exhaust port, communicate the intake air path with the exhaust air path on the outdoor side of the heat exchange element, and drive the fan for the intake air path and the fan for the exhaust air path to operate; and in the heat exchange operation, the controller is configured to open the outdoor suction port, open the outdoor discharge port, open the indoor suction port, open the indoor exhaust port, and drive the fan for the intake air path and the fan for the exhaust air path to operate.

Optionally, the lower the outdoor temperature is, the less the time of the heat exchange operation in the strong defrosting mode is.

Optionally, the total heat exchange device comprises a memory and a threshold comparator, the memory is configured to memorize a temperature threshold A and a temperature threshold B smaller than the temperature threshold A; the threshold comparator is configured to perform a comparison of the outdoor temperature detected by the temperature detector to the temperature threshold A and the temperature threshold B, according to the comparison result of the threshold comparator, the controller is further configured to: perform the heat exchange mode when the outdoor temperature is greater than the temperature threshold A, perform the strong defrosting mode when the outdoor temperature is smaller than the temperature threshold A and greater than the temperature threshold B, or perform the freeze prevention mode when the outdoor temperature is smaller than the temperature threshold B.

Optionally, after the controller has performed the heat exchange mode, the strong defrosting mode or the freeze prevention mode for a predetermined time period, which may normally be within a range of 9 minutes to 70 minutes depending on the outdoor temperature. The temperature detector detects the outdoor temperature again, the threshold comparator performs the comparison again, and the controller performs a mode corresponding to the outdoor temperature detected again.

According to another aspect of the present disclosure, there is provided a controlling method of a total heat exchange device to control heat exchange between the air directed from the inside of the room to the outside of the room and the air from the outside of the room to the inside of the room, comprising a temperature detecting step, a selecting step and a performing step, wherein the temperature detection step comprises detecting an outdoor temperature; the selecting step comprises, in accordance with the outdoor temperature detected in the temperature detecting step, selecting a heat exchange mode in which heat is exchanged between the air directed from the inside of the room to the outside of the room and the air from the outside of the room to the inside of the room or a defrosting mode in which the frost formed on the heat exchange element during the heat exchange is thawed; and the performing step comprises performing the mode selected in the selecting step.

Optionally, in the heat exchange operation in the defrosting mode, amount of the air directed to the indoor intake port is reduced compared with that in the heat exchange mode.

BRIEF DESCRIPTION OF THE DRAWINGS

In order to describe the technical solution of the embodiments of the present disclosure more clearly, the drawings of the embodiments will be briefly described below. It will be apparent that the drawings in the following description are merely illustrative of some embodiments of the disclosure and are not intended to limit the same, in which.

REFERENCE LIST

1—total heat exchange device
2—body
3—side face
4—outdoor suction port
5—outdoor discharge port
6—indoor exhaust port
7—indoor intake port
8—intake air path
9—exhaust air path
10—fan for intake air path
11—fan for exhaust air path
12—intake motor
13—exhaust motor
14—heat exchange element
15—temperature detector
16—controller
17—memory
18—threshold comparator
19—damper
20—gear motor

DETAILED DESCRIPTION OF PREFERRED EMBODIMENTS

Hereinafter, specific embodiments of the present disclosure will be described in detail with reference to the accompanying drawings. It is to be understood that the specific embodiments described herein are for the purpose of illustration and explanation only and are not intended to be limiting of the disclosure.

The present disclosure provides a total heat exchange device comprising: a fan which directs air from an indoor exhaust port to an outdoor discharge port through an exhaust air path, a fan which directs air from an outdoor suction port to an indoor intake port through an intake air path, and a heat exchange element configured for exchanging heat between the air passing along the exhaust air path and the air passing along the intake air path. The total heat exchange device further comprises a temperature detector for detecting an outdoor temperature, and a controller which, according to the outdoor temperature detected by the temperature detector, performs a heat exchange mode in which heat is exchanged between the air passing along the exhaust air path and the air passing along the intake air path or a defrosting mode in which frost on the heat exchange element is thawed.

With abovementioned structure, it is possible to ensure the amount of indoor ventilation while preventing the heat exchange element from being frozen.

The defrosting mode comprises a strong defrosting mode in which an internal circulation operation and a heat exchange operation are performed. In the internal circulation operation, the air sucked from the indoor exhaust port is discharged out of the heat exchange element through the exhaust air path in the heat exchange element, and then discharged from the indoor intake port after being discharged from the heat exchanger element through the intake air path in the heat exchange element. In the heat exchange operation, the air is directed from the indoor exhaust port through the exhaust air path to the outdoor discharge port, while air is directed from the outdoor suction port through the intake air path to the indoor intake port, and heat exchange is performed between the air passing along the exhaust air path and the air passing along the intake air path.

With above mentioned structure, in case that an outdoor temperature is low, the heat exchange element is heated by warm indoor air in the internal circulation operation so as to prevent the heat exchange element from being frozen.

The defrosting mode further comprises a freeze prevention mode in which a stop operation and a heat exchange operation are performed, and in the stop operation, the air suction from the indoor exhaust port and the outdoor suction port is stopped, and the air discharging from the indoor intake port and the outdoor discharge port is stopped.

With the above mentioned structure, in case that the outdoor temperature is extremely low, the operation efficiency of the heat exchange device is reduced while the indoor ventilation rate is ensured in order to protect the heat exchange element.

The heat exchange mode comprises the heat exchange operation.

With the above mentioned structure, the indoor air ventilation is realized, and the heat recovery from the exhaust air of the room is transmitted to the outdoor suction air to reduce the heat loss of the indoor cold and warm the equipments.

In the internal circulation operation, the controller is configured to close the outdoor suction port, close the outdoor discharge port, switch a damper having an open state in which the intake air path and the exhaust air path are communicated with each other and a closed state in which the intake air path and the exhaust air path are separated from each other into the open state, open the indoor intake port, open the indoor exhaust port, communicate the intake air path with the exhaust air path on the outdoor side of the heat exchange element, and drive the fan for intake air path and the fan for exhaust air path to operate; and in the heat exchange operation, the controller is configured to open the outdoor suction port, open the outdoor discharge port, open the indoor suction port, open the indoor exhaust port, and drive the fan for intake air path and the fan for exhaust air path to operate.

With the above mentioned structure, in the strong defrosting mode, the temperature of the heat exchange element is increased by the warm air in the room, such that the frost on the heat exchange element is removed in the internal circulation operation.

The lower the outdoor temperature is, the less the time of the heat exchange operation in the strong defrosting mode is.

With the above mentioned structure, in case that the outdoor temperature is low, the time of heat exchange operation in the strong defrosting mode is shortened, such that the defrosting effect of the heat exchange element is ensured while the indoor ventilation rate is ensured.

The total heat exchange device comprises a memory and a threshold comparator, the memory is configured to memorize a temperature threshold A and a temperature threshold B smaller than the temperature threshold A; the threshold comparator is configured to perform a comparison of the outdoor temperature detected by the temperature detector to the temperature threshold A and the temperature threshold B. According to the comparison result of the threshold comparator, the controller is further configured to: perform the heat exchange mode when the outdoor temperature is greater than the temperature threshold A, perform the strong defrosting mode when the outdoor temperature is smaller than the temperature threshold A and greater than the temperature threshold B, or perform the freeze prevention mode when the outdoor temperature is smaller than the temperature threshold B.

According to the above mentioned structure, the respective operation modes are performed according to the outdoor temperature detected by the temperature detector, and the ventilation rate is ensured while the heat exchange element is protected.

After the controller has performed the heat exchange mode, the strong defrosting mode or the freeze prevention mode for a predetermined time period, the temperature detector detects the outdoor temperature again, the threshold comparator performs the comparison again, and the controller performs a mode corresponding to the outdoor temperature detected again.

With the above-described structure, the mode corresponding to the detected outdoor temperature is performed so as to protect the heat exchanger element.

There is provided a controlling method of a total heat exchange device to control heat exchange between the air directed from the inside of the room to the outside of the room and the air from the outside of the room to the inside of the room, comprising a temperature detecting step, a selecting step and a performing step, wherein the temperature detection step comprises detecting an outdoor temperature; the selecting step comprises, in accordance with the outdoor temperature detected in the temperature detecting step, selecting a heat exchange mode in which heat is exchanged between the air directed from the inside of the room to the outside of the room and the air from the outside of the room to the inside of the room or a defrosting mode in which the frost formed on the heat exchange element during the heat exchange is thawed; and the performing step comprises performing the mode selected in the selecting step.

With the above mentioned structure, the indoor ventilation rate is ensured while preventing freezing.

In the heat exchange operation in the defrosting mode, amount of the air directed to the indoor intake port is reduced compared with that in the heat exchange mode. With the above mentioned structure, in case that the outdoor temperature is low, the contact between the outdoor air of low temperature of the heat exchange element and the heat exchange element is reduced to prevent the heat exchange element from being frosted and frozen.

An embodiment of the present disclosure will be described below with reference to the drawings.

A total heat exchange device 1 according to an embodiment of the present disclosure is provided in a building on a back of a ceiling or on a side wall thereof or under the ground. The following description is set forth by an example of the total heat exchange device being provided on the back of the ceiling of the building.

Figure 1:
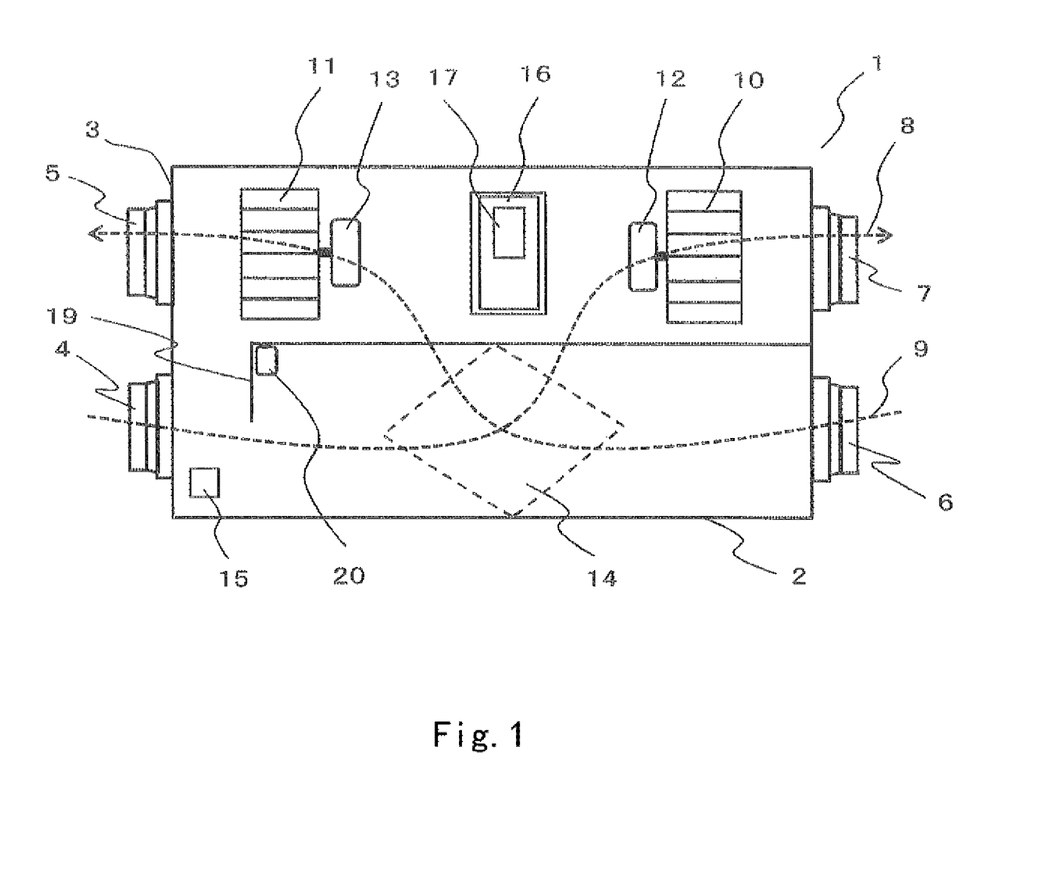
FIG. 1 is a schematic view showing a structure of a total heat exchange device according to an embodiment of the present disclosure.

FIG. 1 is a schematic view showing a structure of the total heat exchange device according to the embodiment of the present disclosure. As shown, a body 2 of the total heat exchange device is of a rectangular parallelepiped shape, and an outdoor suction port 4 for sucking outdoor air into a room and an outdoor discharge port 5 for discharging indoor air out of the room are provided on one side face 3 (left side in FIG. 1) of the body 2. An indoor exhaust port 6 for sucking the indoor air out of the room and an indoor intake port 7 for introducing air into the room are provided being opposite to the side face 3.

The inside of the body 2 is provided with an intake air path 8 communicating the outdoor suction port 4 for sucking the outdoor air with the indoor intake port 7 for intaking the indoor air, and an exhaust air path 9 communicating an indoor exhaust port 6 for sucking the indoor air with the outdoor discharge port 5 for discharging the indoor air out of the room.

Further, the total heat exchange device 1 is provided with a fan 10 for intake air path used as an intake air path generation means in the intake air path 8 and a fan 11 for the exhaust air path used as an exhaust air path generation means in the exhaust air path 9.

The fan 10 for intake air path and a fan 11 for the exhaust air path are connected to an intake motor 12 and an exhaust motor 13 respectively. Air flows in the air paths are generated by rotation driving of the fans.

The total heat exchange device 1 is provided with a heat exchange element 14 which performs heat exchange between the air passing through the exhaust air path 9 and the air passing through the intake air path 8. The heat exchange element 14 comprises a plurality of heat transfer plates which are laminated and spaced apart from each other. The heat transfer plates have an isolation function, so that, with the flows of the indoor exhaust air and the outdoor suction air at the heat transfer plates, heat of the exhaust air from the room can be recovered and transferred to the air supplied from the outside. Specifically, when the heat exchange operation is performed by the total heat exchange device 1, heat is transferred from the indoor air to the outdoor air through the heat exchange element 14 and the outdoor air is warmed with the heat of the indoor air before the indoor air sucked from the indoor exhaust port 6 being discharged to the outdoor discharge port 5 through the exhaust air path 9 and the outdoor air sucked from the outdoor suction port 4 being discharged to the indoor intake port 7 through the intake air path.

In the heat exchange device 1, a temperature detector 15 for detecting the outdoor temperature is provided at the outdoor suction port 4 for sucking the outdoor air.

Specifically, the outdoor suction port 4 is provided with a thermistor used as the temperature detector 15. When the outdoor air sucked from the outdoor suction port 4 contacts the thermistor, the temperature of the outdoor air is detected by the thermistor.

The total heat exchange device 1 is provided with a controller 16, a threshold comparator and a memory 17 which will be described below.

The memory 17 memorizes a temperature threshold A and a temperature threshold B smaller than the temperature threshold A.

The threshold comparator compares the outdoor temperature detected by the temperature detector 15 with the temperature threshold A and the temperature threshold B read from the memory 17.

Specifically, the controller 16 is a microcomputer. According to a comparison result obtained by the threshold comparator which will be described below, the controller 16 determines to operate the total heat exchange device in a heat exchange mode, a strong defrosting mode or a freeze prevention mode. Specifically, the total heat exchange device is operated in the heat exchange mode when the outdoor temperature is greater than the temperature threshold A. The total heat exchange device is operated in the strong defrosting mode when the outdoor temperature is smaller than the temperature threshold A and greater than the temperature threshold B. The total heat exchange device is operated in the freeze prevention mode when the outdoor temperature is smaller than the temperature threshold B.

Details of these modes will be described hereinafter.

The heat exchange device 1 is provided with a damper 19 in the body 2, and the damper 19 may communicate the intake air path 8 with the exhaust air path 9 or separates them from each other. The damper 19 is controlled by a gear motor 20. When the damper 19 is controlled by the gear motor 20 such that the damper 19 is in an open state, the intake air path 8 and the exhaust air path 9 are communicated with each other, and when the damper 19 is controlled by the gear motor 20 such that the damper 19 is in a closed state, the intake air path 8 and the exhaust air path 9 are separated from each other.

Figure 2:
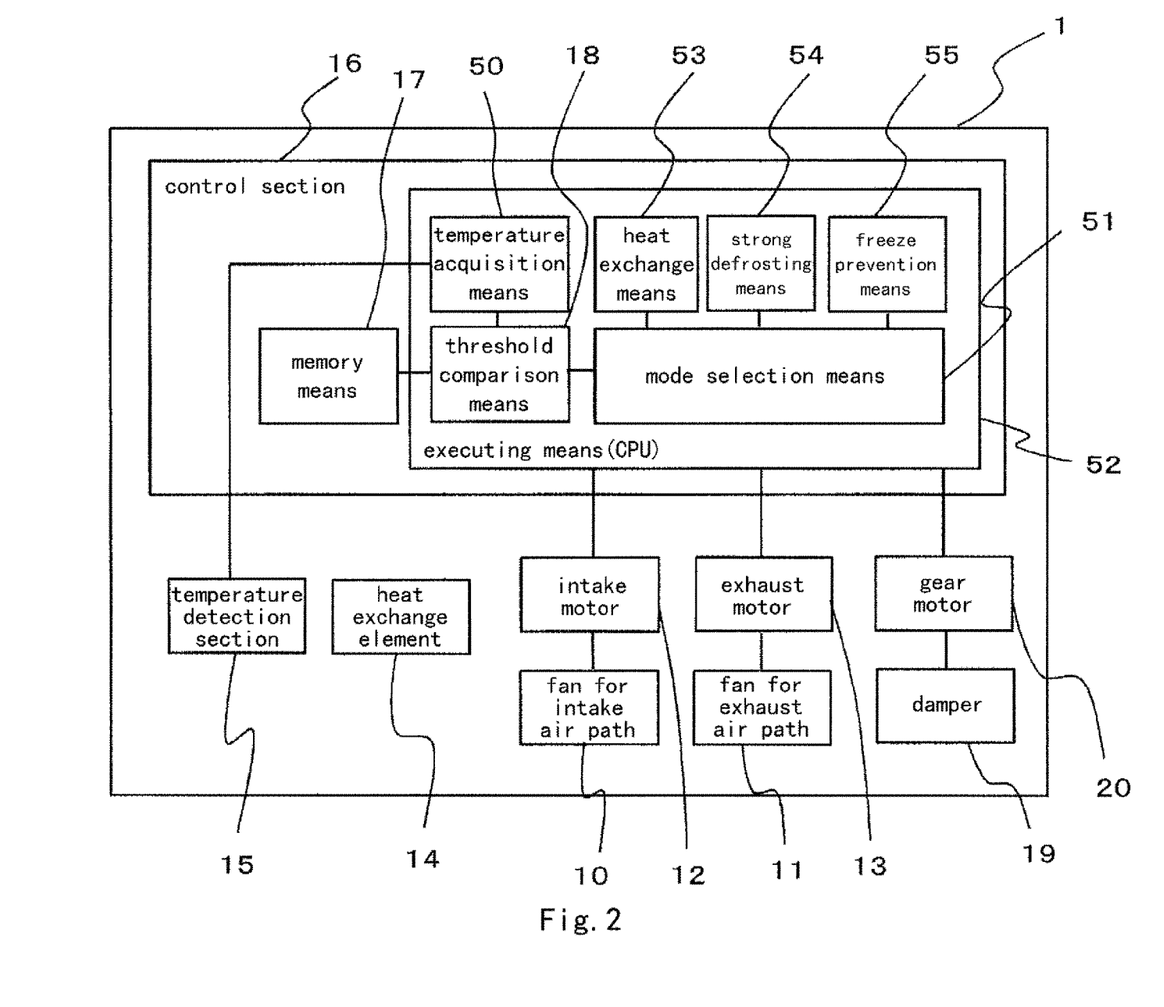
FIG. 2 is a block diagram showing a function of the total heat exchange device according to an embodiment of the present disclosure.

FIG. 2 is a block diagram showing the function of the total heat exchange device according to an embodiment of the present disclosure.

As shown in FIG. 2, the controller 16 is a microcomputer. The controller 16 comprises a CPU and the memory 17.

The memory 17 is a built-in RAM or ROM in the microcomputer. The memory 17 memorizes a temperature acquisition means 50, a threshold comparator 18, a mode selection means 51, a heat exchange means 53, a strong defrosting means 54 or a freeze prevention means 55 as a program.

The controller 16 utilizes the CPU, which is used as an executing means 52, to execute respective programs memorized by the memory 17. The controller 16 is connected to a combination unit consisted of the temperature detector 15, the heat exchange element 14, the intake motor 12, the exhaust motor 13 and the gear motor 20. The controller 16 controls each of these components according to the programs, such that the total heat exchange device 1 is operated in the heat exchange mode, the strong defrost mode, or the freeze prevention mode.

The operation of the above mentioned structures to prevent freezing while ensuring the amount of ventilation will be described with reference to FIG. 3 to FIG. 5.

Figure 3:
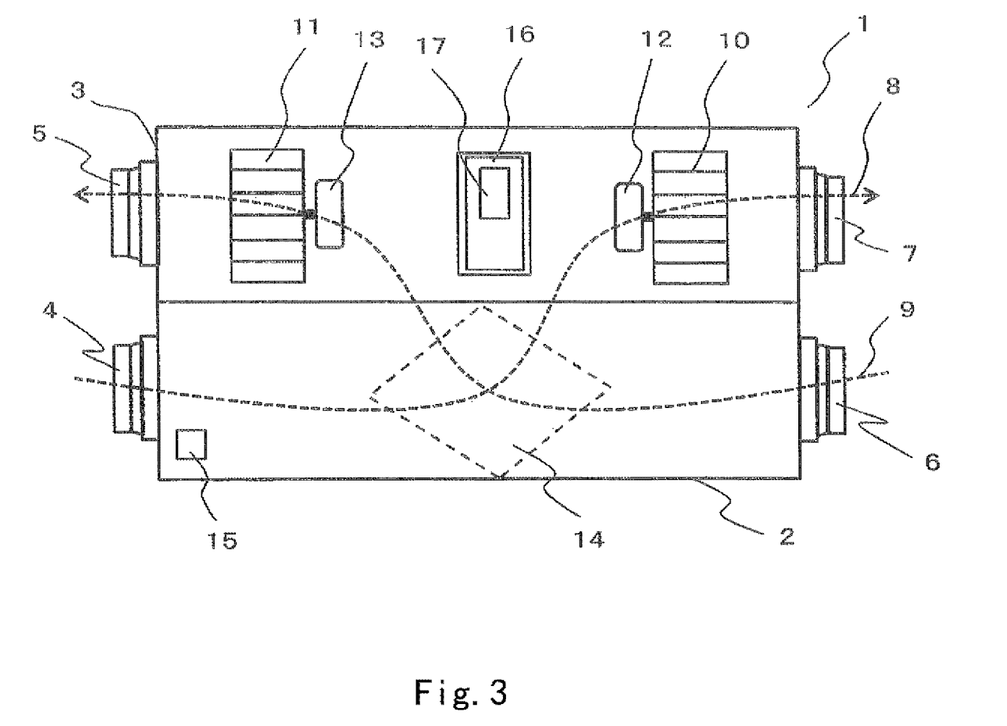
FIG. 3 is a schematic view showing air path in a heat exchange mode of the total heat exchange device according to an embodiment of the present disclosure.

FIG. 3 is a schematic view of the air path in the heat exchange mode of the total heat exchange device according to an embodiment of the present disclosure. As shown in FIG. 3, the total heat exchange device 1 runs and the controller 16 detects outdoor temperature with the temperature detector 15 provided at the outdoor suction port 4. Due to the electrical noise, instantaneous temperature value tends to fluctuate. In this regard, the temperature detector 15 takes a sample of the value detected by the temperature detecting section 15 every second, and the controller 16 uses an average value of the values of detected temperatures during a certain time (for example, 20 seconds) to perform the control. The controller 16 compares the detected outdoor temperature with the temperature threshold A, the temperature threshold B by the threshold comparator 18. When the outdoor temperature is greater than the temperature threshold A or equal to the temperature threshold A, the controller 16 performs a heat exchange operation for a predetermined time. For example, when the temperature threshold A is −10° C., the temperature threshold B is −30° C., and the outdoor temperature is detected to be 0° C., the heat exchange operation is performed.

That is, when performing the heat exchange operation, the controller 16 opens the outdoor suction port 4, the outdoor discharge port 5, the indoor intake port 7 and the indoor exhaust port 6, and controls the damper 19 to be in a closed state such that the intake air path 8 and the exhaust air path 9 are separated from each other, and drives the fan 11 for exhaust air path and the fan 10 for the intake air path to operate.

The total heat exchange device 1 performs a heat exchange mode, when the outdoor temperature is greater than the temperature threshold A. When the controller 16 performs the heat exchange operation, the heat exchange element 14 recovers the heat of the air exhausted from the room and transfers it to the intake air from the outside, and at the same time, the total heat exchange device 1 performs ventilation of the indoor air. In this regard, the heat loss due to ventilation is reduced, which will make the user feel more comfortable.

Figure 4A:
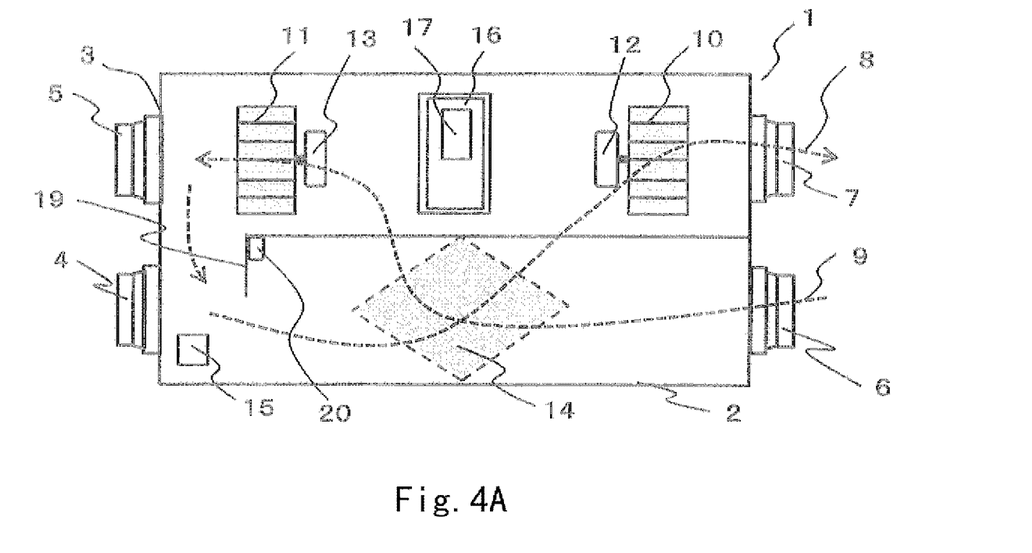
FIG. 4A is a schematic view showing air path in an internal circulation operation of a strong defrosting mode of the total heat exchange device according to an embodiment of the present disclosure.
Figure 4B:
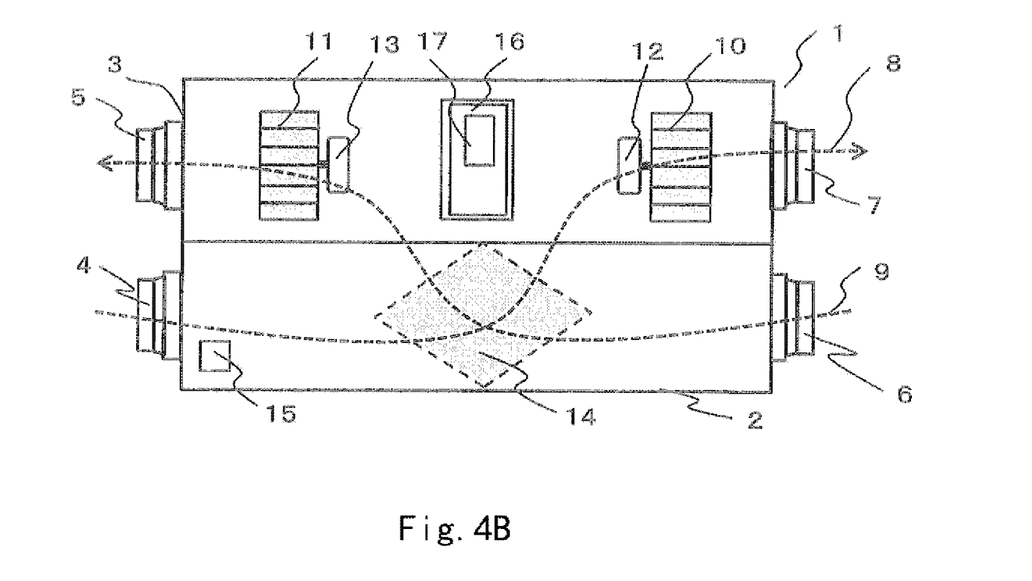
FIG. 4B is a schematic view showing the air path in the heat exchange operation of the strong defrosting mode of the total heat exchange device according to an embodiment of the present disclosure.

FIG. 4A is a schematic view showing the air path in the internal circulation operation of the strong defrosting mode of the total heat exchange device according to an embodiment of the present disclosure; and FIG. 4B is a schematic view showing the air path in the heat exchange operation of the strong defrosting mode of the total heat exchange device according to an embodiment of the present disclosure.

As shown in FIGS. 4A and 4B, the strong defrost mode comprises an internal circulation operation and a heat exchange operation.

In case that the temperature is extremely low, the heat exchange element 14 will be frozen even if the heat of the air exhausted from the room is recovered. In this regard, the total heat exchange device 1 is operated in the strong defrost mode, that is, performs the following operations.

The controller 16 detects the outdoor temperature with the temperature detector 15, for example, after performing the heat exchange operation for a predetermined time. The threshold comparator 18 compares the detected outdoor temperature with the temperature threshold A and the temperature threshold B. The controller 16 performs the internal circulation operation for a predetermined time when the outdoor temperature is smaller than the temperature threshold A and greater than or equal to the temperature threshold B. For example, if the temperature threshold A is −10° C., the temperature threshold B is −30° C., and the outdoor temperature is detected as −20° C., the internal circulation operation is performed. In case that the internal circulation operation is performed, the controller 16 closes the outdoor suction port 4 and the outdoor discharge port 5, opens the damper 19, the indoor intake port 7 and the indoor exhaust port 6, communicates the intake air path 8 with the exhaust air path 9 at the outdoor side of the heat exchange element 14, and drives the fan 10 for intake air path and the fan 11 for exhaust air path to operate.

After the controller 16 performs the internal circulation operation for a predetermined time, it further performs the heat exchange operation for a predetermined time. In the heat exchange operation, the controller 16 opens the outdoor suction port 4, the outdoor discharge port 5, the indoor intake port 7 and the indoor exhaust port 6, closes the damper 19, and drives the fan 10 for intake air path and the fan 11 for exhaust air path to operate.

As described above, in case that the outdoor temperature is low, the total heat exchange device 1 is turned into the strong defrosting mode in order to prevent the air path in the heat exchange element 14 from being clogged due to the generation and increasing of the internal frost. The total heat exchange device 1 fully increases the temperature of the heat exchange element 14 and removes the frost on the heat exchange element 14 with the warm air from the room by performing the internal circulation operation. Then, by performing the heat exchange operation, the heat of the indoor exhaust air is recovered and transferred to the sucked air from the outside. The heat of the warm air from the room is sufficiently recovered, while the indoor air is ventilated. In this way, the defrosting effect of the heat exchange element 14 may be ensured while the indoor ventilation is ensured.

The amount of the air directed into the indoor intake port 7 is reduced when the heat exchange operation is reduced.

With the above mentioned structure, the amount of air from the outside into the room is reduced, thereby reducing the contact between the low temperature air and the heat exchange element 14 through the heat exchange element 14 to prevent the heat exchange element 14 from being frosted and frozen.

In addition, it is also possible to increase the amount of air from the room to the outside.

In the present embodiment, the lower the outdoor temperature is, the shorter the duration of time for the heat exchange operation in the strong defrosting mode is. For example, assuming that the temperature threshold A is −10° C. and the temperature threshold B is −30° C., if the outdoor temperature is detected to be −12° C., the duration of the internal circulation operation is 9 minutes and the duration of the heat exchange operation is 70 minutes. If the outdoor temperature is detected as −18° C., the duration of the internal circulation operation is still 9 minutes, but the duration of the heat exchange operation is 35 minutes.

With the above structure, in case that the outdoor temperature is low, the amount of air with a low temperature sucked from the outside is limited by shortening the duration of the heat exchange operation. It may reduce the frost on the heat exchange element 14 so that all the frost can be thawed by the internal circulation operation. In case that the outdoor temperature is low, both the defrosting effect of the element 14 and the indoor ventilation rate are ensured by shortening the duration of the heat exchange operation in the strong defrost mode.

However, the duration of the heat exchange operation is not changed within a predetermined temperature range in order to avoid frequent changes of the duration of the heat exchange operation due to an error of the temperature detector 15. Specifically, a range of the outdoor temperature which is smaller than the temperature threshold A and greater than or equal to the temperature threshold B may be divided into a plurality of temperature sections based on the value of the temperature. As compared with a situation of the outdoor temperature is in a higher temperature section, the duration of the heat exchange operation in the strong defrost mode is less when the outdoor temperature is in a lower temperature section. For example, assuming that the temperature threshold A is −10° C. and the temperature threshold B is −30° C., the temperature range from −10° C. to −30° C. is divided into four temperature sections: "−10° C.>outdoor temperature≥−15° C.", "−15° C.>outdoor temperature≥−20° C.", "−20° C.>outdoor temperature ≥−27° C.", "−27° C.>outdoor temperature ≥−30° C.".

In case that the outdoor temperature is lower than −10° C. but higher than −15° C. or equal to −15° C., the duration of the heat exchange operation is always set to be 70 minutes regardless of an actual temperature being at −11° C. or at −14° C. In case that the outdoor temperature is lower than −15° C. but higher than −20° C. or equal to −20° C., the duration of the heat exchange operation is always set to be 35 minutes regardless of the actual temperature being at −16° C. or at −19° C.

Figure 5A:
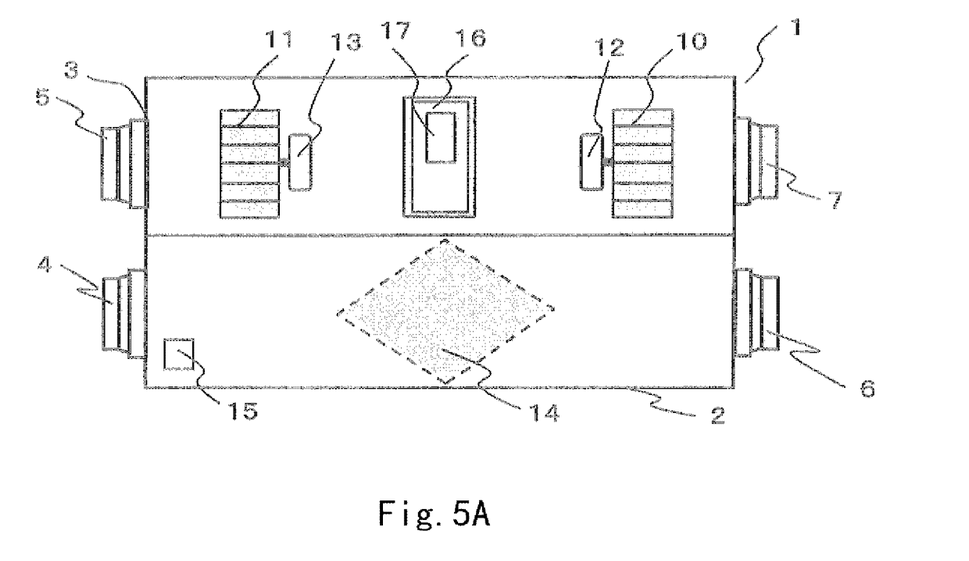
FIG. 5A is a schematic view showing the air path in the stop operation of the freeze prevention mode of the total heat exchange device according to an embodiment of the present disclosure.
Figure 5B:
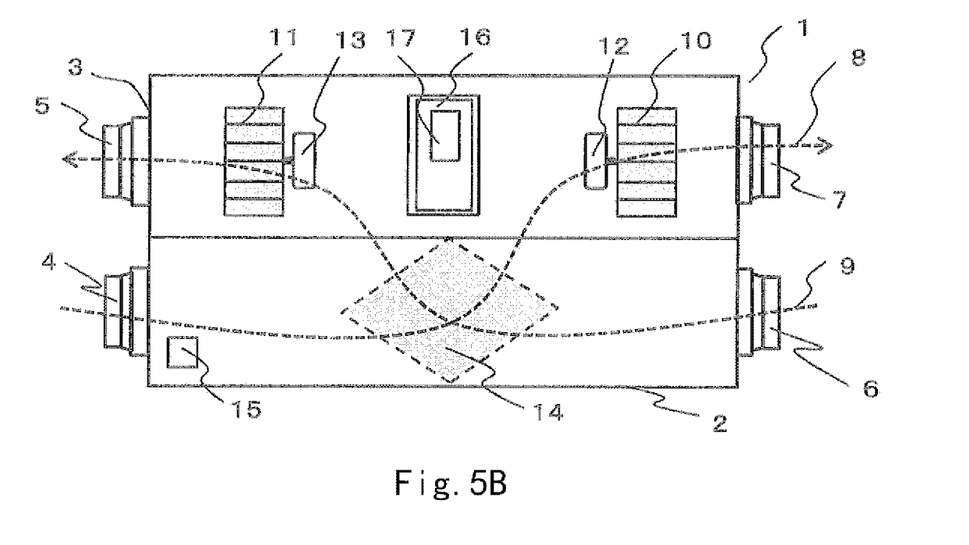
FIG. 5B is a schematic view showing the air path in the heat exchange operation of a freeze prevention mode of the total heat exchange device according to an embodiment of the present disclosure.

FIG. 5A is a schematic view showing the air path in the stop operation of the freeze prevention mode of the total heat exchange device according to an embodiment of the present disclosure;

FIG. 5B is a schematic view showing the air path in the heat exchange operation of the freeze prevention mode of the total heat exchange device according to an embodiment of the present disclosure.

As shown in FIGS. 5A and 5B, the freeze prevention mode comprises a stop operation and a heat exchange operation.

For example, the controller 16 detects the outdoor temperature with the temperature detector 15, after the heat exchange operation has been performed for a predetermined time. The threshold comparator 18 compares the detected outdoor temperature with the temperature threshold A and the temperature threshold B. In case that the outdoor temperature is smaller than the temperature threshold B, the controller 16 performs the stop operation for a predetermined time. For example, if the temperature threshold A is −10° C., the temperature threshold B is −30° C., and the outdoor temperature is −35° C., the stop operation is performed. In the freeze prevention mode, the controller 16 closes the outdoor suction port 4 and the outdoor discharge port 5, stops the operation of the fan 11 for exhaust air path, and stops the operation of the fan 10 for intake air path. The controller 16 performs a heat exchange operation with a minimum air flow rate for a predetermined time, after the stop operation has been performed for a predetermined time.

In the heat exchange operation, the controller 16 opens the outdoor suction port 4, the outdoor discharge port 5, the indoor intake port 7 and the indoor exhaust port 6, and drives the fan 11 for exhaust air path and the fan 10 for intake air path to operate. During the stop operation, the temperature detector 15 cannot detect the temperature of the outdoor air sucked from the outdoor suction port 4, so the heat exchange operation with the minimum air flow rate is performed for a predetermined time. However, in order to prevent that the heat exchange operation from causing a cold wind feel of a user, the heat exchange operation is performed with the minimum air flow rate.

As described above, in case that the outdoor temperature is extremely low, the total heat exchange device 1 is switched into the freeze prevention mode, and by performing the stop operation, the air is not sucked from the outside to inside of the room, and the ventilation of the indoor air is not performed. In this way, the heat exchange element 14 is protected from being frozen. In case that the heat exchange operation is performed, the outdoor air is sucked from the outdoor suction port 4, and the temperature detector 15 detects the temperature. Then a next operation mode is determined according to the newly detected temperature, and the heat of the indoor exhaust air is transferred to the air sucked from outside while the ventilation of the indoor air is performed.

The amount of air directed to the indoor intake port 7 is reduced when the heat exchange operation is reduced.

With the above mentioned structure, the amount of air from outside to inside of the room is reduced, thereby the contact between the outdoor air of low temperature passing through the heat exchange element 14 and the heat exchangers 14 to prevent the heat exchange element 14 from being frosted and frozen.

In addition, it is also possible to increase the amount of air from the inside to the outside of the room.

In short, the indoor ventilation amount is ensured while the operating efficiency of the total heat exchange device 1 is reduced, so as to protect the heat exchange element 14.

Figure 6:
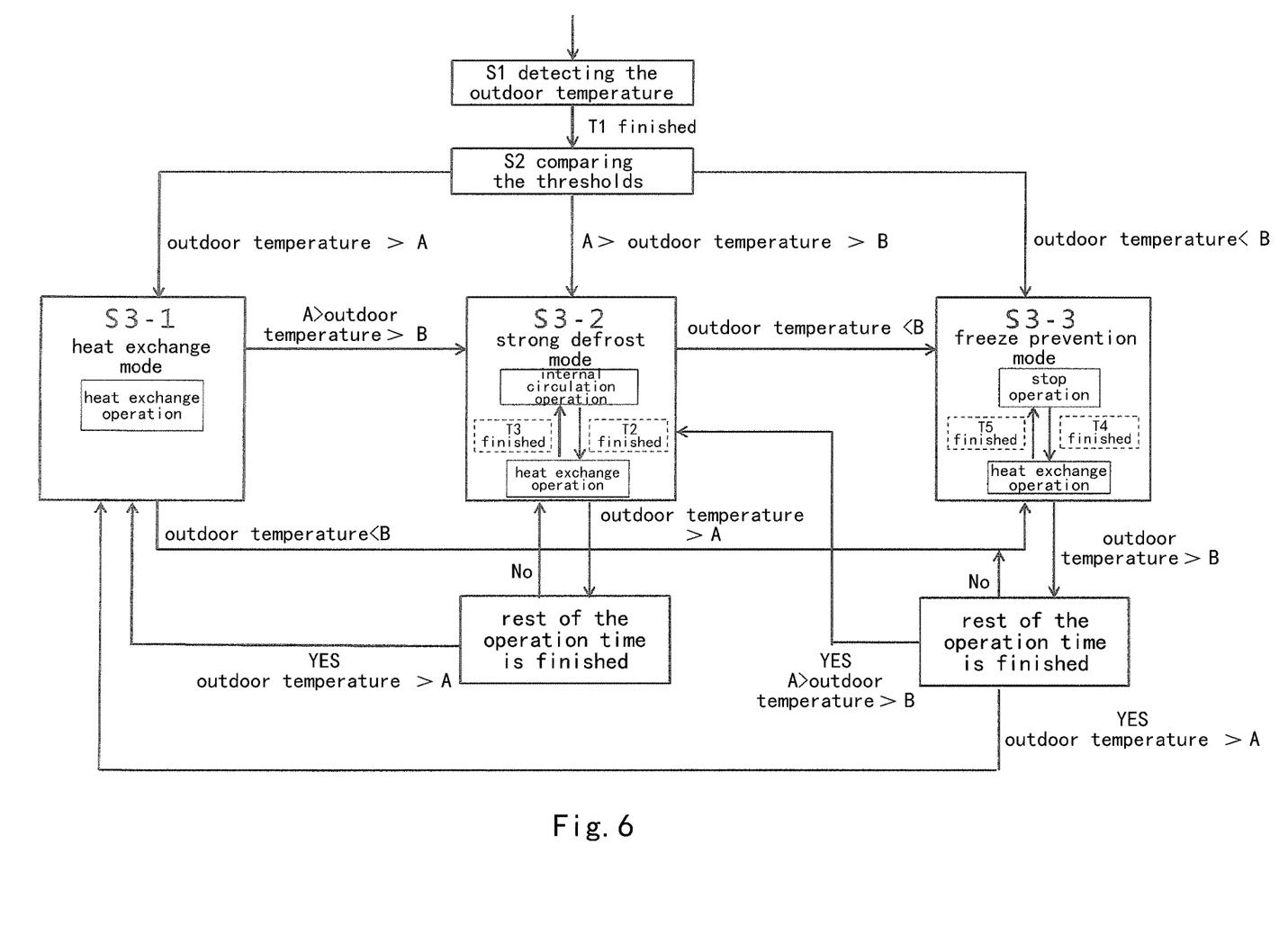
FIG. 6 is a control flow chart of the total heat exchange device according to an embodiment of the present disclosure.

FIG. 6 is a control flow chart of a total heat exchange device according to an embodiment of the present disclosure. As shown in FIG. 6, a control method may include the following steps.

Start.

Step S1: The temperature detector 15 detects the outdoor temperature.

Step S2: Making the comparison and determining whether the outdoor temperature is higher than or equal to the pre-set temperature threshold A, and whether the outdoor temperature is higher than or equal to the temperature threshold B. The temperature value is invalid during the time period T1 from the start of the control process to the time at which the temperature is detected correctly (a time period for the value of the temperature to be stable+a time period for preventing electrical noise and for averaging the temperature values). After the time period T1 has past, if the value indicating the outdoor temperature is larger than or equal to the temperature threshold A, the process proceeds to a next step S3-1; if the value indicating the outdoor temperature is smaller than the temperature threshold A and is larger than or equal to the temperature threshold B, the process proceeds to a next step S3-2; if the value indicating the outdoor temperature is smaller than the temperature threshold B, the process proceeds to a next step S3-3.

Step S3-1: Proceeding to the heat exchange mode, in which the outdoor temperature is frequently detected while the heat exchange operation is performed. When the value indicating the outdoor temperature is detected to be smaller than the temperature threshold A and greater than or equal to the temperature threshold B, the process proceeds to step S3-2. When the value indicating the outdoor temperature is detected to be smaller than the temperature threshold B, the process proceeds to step S3-3.

Step S3-2: Proceeding to the strong defrost mode, in which the temperature detector 15 continues to detect the outdoor temperature frequently. After the start of the strong defrost mode, operations are performed periodically and one cycle is defined as being consisted of an internal circulation operation followed by an heat exchange operation, and the next mode is determined according to the outdoor temperature detected at the end of the heat exchange operation. However, if a temperature condition detected is lower than a current temperature (i.e., the temperature has been decreased to fall within a lower temperature section or to be lower than the temperature threshold B) during the internal circulation operation and the heat exchange operation, it is immediately changed to an operation corresponding to the newly detected temperature. Specifically:

If detected outdoor temperature is constantly within the current temperature section during the internal circulation operation and the heat exchange operation, the internal circulation operation is performed for a predetermined time period T2 to melt the frost adhering to the heat exchange element 14. After the time period T2, the heat exchange operation is performed for a given time period T3 to achieve indoor ventilation. After the time period T3 has past, if the value indicating that the outdoor temperature is detected to be greater than or equal to the temperature threshold A, the process proceeds to step S3-1; if the outdoor temperature is detected to be smaller than the temperature threshold A and is greater than or equal to the temperature threshold B, the process proceeds to S3-2 again; and if the value indicating the outdoor temperature is detected to be smaller than the temperature threshold value B, the process proceeds to step S3-3.

If it is detected that the outdoor temperature has been decreased into a temperature section which is lower than the current temperature section, the internal circulation operation and the heat exchange operation are started immediately according to the duration of the internal circulation operation and the heat exchange operation corresponding to the lower temperature section.

If it is detected that the value indicating the outdoor temperature has been decreased to lower than the temperature threshold B during the internal circulation operation and the heat exchange operation, the process proceeds to step S3-3.

If it is detected that the outdoor temperature has been increased into a temperature section higher than the current temperature section during the internal circulation operation and the heat exchange operation, the internal circulation operation or the heat exchange operation corresponding to the current temperature zone is continued, until the remaining operation time is over. After the time period T3 has past, if the value indicating that the outdoor temperature is detected to be greater than or equal to the temperature threshold A, the process proceeds to step S3-1; if the outdoor temperature is detected to be smaller than the temperature threshold A and is greater than or equal to the temperature threshold B, the process proceeds to the step S3-2 again; and if the value indicating the outdoor temperature is detected to be smaller than the temperature threshold value B, the process proceeds to step S3-3.

If it is detected that the outdoor temperature is greater than or equal to the temperature threshold A during the internal circulation operation and the heat exchange operation, the internal circulation operation or the heat exchange operation corresponding to the current temperature section is continued until the remaining operation time ends. If the value indicating that the outdoor temperature is detected to be greater than or equal to the temperature threshold A, the process proceeds to step S3-1; if the outdoor temperature is detected to be smaller than the temperature threshold A and greater than or equal to the temperature threshold B, The process proceeds to step S3-2 again; and if the outdoor temperature is detected to be smaller than the temperature threshold value B, the process proceeds to step S3-3.

In this regard, it is possible to avoid frequent changes of currently performed mode due to the error of the temperature detecting section 15 or minor changes of the temperature. In case that the outdoor temperature has been decreased to a temperature at which frosting may occur, the heat exchange element is immediately warmed through the internal circulation operation, or it may be protected from being frozen by the stop operation.

Step S3-3: proceeding to the freeze prevention mode. After the stop operation has been performed for a predetermined time period T4, in order that the temperature detector 15 can detect the temperature of the outdoor air, the heat exchange operation is performed with a minimum air flow rate for a predetermined time period T5. After the time period T5 has past, if the value indicating the outdoor temperature is detected to be greater than or equal to the temperature threshold A, the process proceeds to step S3-1; if the outdoor temperature is detected to be smaller than the temperature threshold A and is greater than or equal to the temperature threshold B, the process proceeds to step S3-2; and if the detected outdoor temperature is smaller than the temperature threshold B, the process proceeds to step S3-3 again. In this way, in case that the outdoor temperature has been decreased to a temperature at which frosting may occur and the frosting cannot be melted within a short time, the stop operation is immediately performed to prevent freezing. In case that the outdoor temperature has been increased sufficiently, the heat exchange operation is performed to ensure the indoor ventilation.

The above described total heat exchange device of the present embodiment has a defrosting mode in which the indoor ventilation amount can be ensured while preventing the heat exchange element from being frozen, and the mode can be applied to the heat exchange element and the total heat exchange device using the heat exchange element.

What is claimed is:

1. A total heat exchange device, comprising:
   an exhaust fan which directs air from an indoor exhaust port to an outdoor discharge port through an exhaust air path;
   an intake fan which directs air from an outdoor suction port to an indoor intake port through an intake air path; and
   a heat exchange element configured for exchanging heat between the air passing through the exhaust air path and the air passing through the intake air path,
   wherein the total heat exchange device further comprises:
   a temperature detector for detecting an outdoor temperature, and
   a controller which is configured to perform a heat exchange mode in which heat is exchanged between the air passing through the exhaust air path and the air passing through the intake air path, in accordance with the outdoor temperature detected by the temperature detector, and the controller is also configured to perform a defrosting mode in which frost on the heat exchange element is thawed, in accordance with the outdoor temperature detected by the temperature detector,
   wherein the defrosting mode comprises a strong defrosting mode in which an internal circulation operation and a heat exchange operation are performed, wherein the lower the outdoor temperature is, the less the time of the heat exchange operation in the strong defrosting mode is, and
   wherein in the internal circulation operation, the air sucked from the indoor exhaust port is discharged out of the heat exchange element through the exhaust air path in the heat exchange element, and then the air is further discharged from the indoor intake port after being discharged from the heat exchanger element through the intake air path in the heat exchange element, the outdoor discharge port and the outdoor suction port are kept closed such that the indoor air is isolated from the outdoor air, and the indoor exhaust port and the indoor intake port are kept opened such that a cycle loop is created to communicate the indoor air and air paths in the heat exchange element; during the internal circulation operation, the controller is configured to close the outdoor suction port, close the outdoor discharge port, switch a damper having an open state in which the intake air path and the exhaust air path are communicated with each other and a closed state in which the intake air path and the exhaust air path are isolated from each other into the open state, open the indoor intake port, open the indoor exhaust port, communicate the intake air path with the exhaust air path on an outdoor side of the heat exchange element, and drive the intake fan for the intake air path and the exhaust fan for the exhaust air path to operate; and
   wherein in the heat exchange operation, the air is directed from the indoor exhaust port through the exhaust air path to the outdoor discharge port, while the air is directed from the outdoor suction port through the intake air path to the indoor intake port, and the heat exchange is performed between the air passing through the exhaust air path and the air passing through the intake air path;

the defrosting mode further comprises a freeze prevention mode in which a stop operation and the heat exchange operation are performed, and wherein, in the stop operation, the fans are stopped, the indoor exhaust port and the outdoor suction port are closed so that air suction from the indoor exhaust port and the outdoor suction port is stopped, and the indoor intake port and the outdoor discharge port are closed so that air discharging from the indoor intake port and the outdoor discharge port is stopped, the heat exchange operation is performed with a minimum air flow rate for a predetermined time, after the stop operation has been performed for a predetermined time.

2. The total heat exchange device according to claim 1, wherein the heat exchange mode comprises the heat exchange operation.

3. The total heat exchange device according to claim 1, wherein in the heat exchange operation, the controller is configured to open the outdoor suction port, open the outdoor discharge port, open the indoor suction port, open the indoor exhaust port, and drive the intake fan for the intake air path and the exhaust fan for the exhaust air path to operate.

4. The total heat exchange device according to claim 1, wherein the total heat exchange device comprises a memory and a threshold comparator, the memory is configured to memorize a temperature threshold A and a temperature threshold B that is smaller than the temperature threshold A;

the threshold comparator is configured to perform a comparison of the outdoor temperature detected by the temperature detector to the temperature threshold A and the temperature threshold B, according to the comparison result of the threshold comparator, the controller is further configured to:

perform the heat exchange mode when the outdoor temperature is greater than the temperature threshold A, perform the strong defrosting mode when the outdoor temperature is smaller than the temperature threshold A and greater than the temperature threshold B, or perform the freeze prevention mode when the outdoor temperature is smaller than the temperature threshold B.

5. The total heat exchange device according to claim 4, wherein after the controller has performed the heat exchange mode, the strong defrosting mode or the freeze prevention mode for a predetermined time period, the temperature detector detects the outdoor temperature again, the threshold comparator performs the comparison again, and the controller performs one of the heat exchange mode, the strong defrosting mode and the freeze prevention mode, corresponding to the outdoor temperature detected again.

6. The total heat exchange device according to claim 1, wherein in the heat exchange operation in the defrosting mode, an amount of the air directed to the indoor intake port is reduced as compared with that in the heat exchange mode.

7. The total heat exchange device according to claim 1, wherein in the heat exchange operation in the defrosting mode, an amount of the air directed to the indoor intake port is reduced as compared with that in the heat exchange mode.

* * * * *